(No Model.)
E. WESTON.
DEVICE FOR CONNECTING SAFETY STRIPS IN ELECTRIC CIRCUITS.
No. 292,716. Patented Jan. 29, 1884.
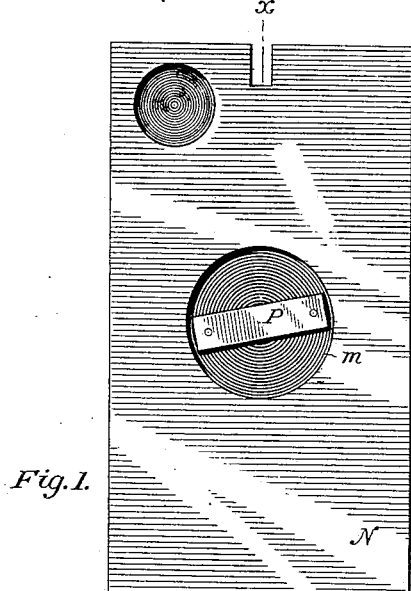
Fig. 1.
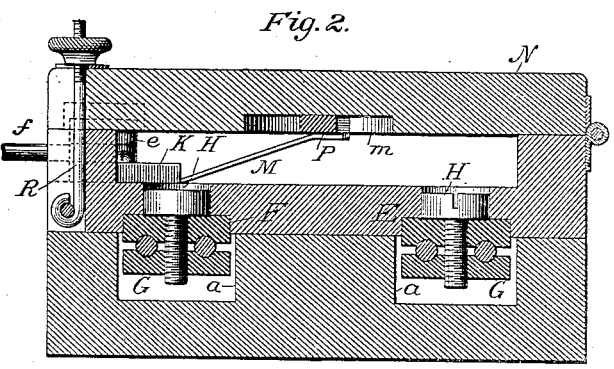
Fig. 2.
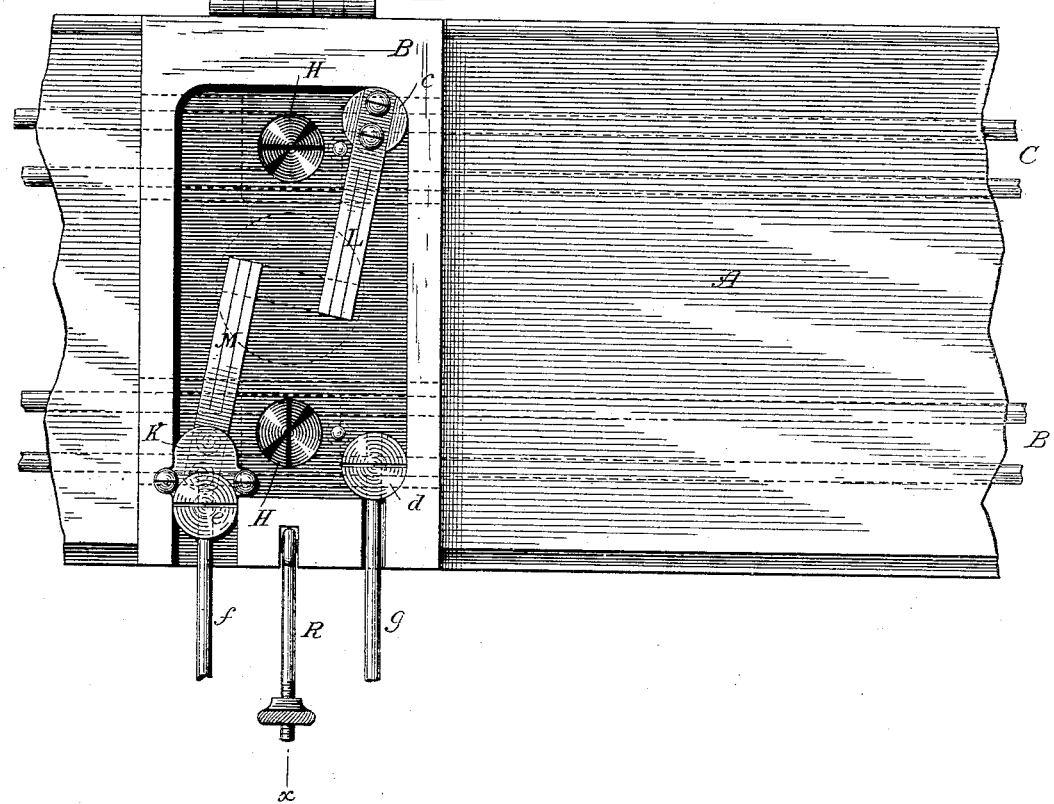
Attest:
Raymond T. Barnes.
W. Frisby
Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DEVICE FOR CONNECTING SAFETY-STRIPS IN ELECTRIC CIRCUITS.

SPECIFICATION forming part of Letters Patent No. 292,716, dated January 29, 1884.

Application filed October 4, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Devices for Connecting Safety-Strips in Electric Circuits, of which the following is a specification, reference being had to the drawings accompanying and forming a part of the same.

The safety-strips invented and employed by me in electrical circuits are composed of a certain alloy easily fused and comparatively soft. I have found that when these are connected to a circuit, in the usual way, by clamps or screws, the metal slowly yields under the pressure of the clamps, in this way impairing the electrical contact. To avoid this I have employed spring clamps or jaws; but the fragile character of the strips makes it difficult to insert them in these clamps, which are usually contained in junction or connection boxes. To provide a ready and easy means of inserting the strips, therefore, and to maintain the electrical connection between them and the conductors of the line unimpaired, I have devised a form of connector, which consists of a set of contact spring plates or strips connected to the ends of a severed circuit, in combination with a holder for the strip, these parts being movable one with respect to the other, and so arranged that when brought together the contact-plates will press upon the end portions of the fusible strip. This arrangement I have illustrated in the accompanying drawings as applied to a connection-box for a multiple-arc system of lighting, the springs or contact-strips in this instance being stationary and the holder movable.

Figure 1 is a view in elevation of a device for carrying the conductors of a circuit and an open connection-box with my invention applied thereto. Fig. 2 is a section of the box on line $x\ x$, Fig. 1.

A designates a holder for the electric conductors, consisting of two slats or boards, the under one containing grooves $a$, in which the conductors are laid, the upper forming a cover.

B is a box that is secured to the under slat, the cover being cut away at a point where it is desired to lead off a branch from the main conductors C D.

E F are copper or brass plates, fitted in recesses in the bottom of box B, and having portions $c\ d$ projecting up into the box.

G G are metal plates, which are employed as clamps to take off the branch circuit.

H H are screws passing through the plates E F and G G.

K is a plate secured in the bottom of the box B, and provided with a binding-post, $e$, to which one of the conductors $f$ of the branch circuit is connected. The part $d$ of the plate F is provided with a screw or other means for attaching to it the other wire, $g$, of the branch circuit. To the part $c$ of the plate E is screwed the end of a spring, L, and to the under side of the plate K is secured a similar spring, M.

N is the hinged lid of the box B. In the center is a depression, $m$, where the safety-strip is to be applied.

P designates the strip, which is to be secured to the lid by cement, pins, or by any means that will serve merely to keep it in position, so that when the lid is closed its ends will be brought into contact with the springs L M.

R is a catch for locking the box when closed.

The purpose and manner of using the device is as follows: The box B is applied to the holder A by cutting away the upper slat at any desired point. Connection is made from the conductors by the clamping-plates E, F, and G, a safety-strip applied to the lid, and the box closed. The circuit will then be complete in the box, one branch being from the positive conductors C, of which there may be any desired number, through the plate E, spring L, the safety-strip P, spring M, and plate K, the other from the negative conductors D, direct through plate F to the branch wire $g$.

I have illustrated but one means of carrying out the invention by the use of spring-contacts and a holder for the safety-strips, movable or adjustable one with reference to the other. This serves, however, as an illustration of the advantages which this construction secures.

The strips, it will be seen from the foregoing, are readily and easily placed in position and connected in circuit, and good contact is maintained between them and the conductors of the line by the pressure of the springs.

In describing the nature and manner of the application of the invention, I have shown and described other features of novelty—such as the holder for the conductors, the junction-box, and others—to which of themselves I do not lay claim herein, as they are or will be made the subject of other applications for Letters Patent.

What I now claim is—

1. The combination, with spring terminal contact strips or plates, of a fusible safety-strip and a holder or support for the same, the contacts and holder being movable with reference to one another, and so arranged that when brought together for use the safety-strips will be connected with the circuit by spring-pressure, as and for the purpose specified.

2. The combination, with a box or case and spring and terminal strips or plates therein, of a fusible safety-strip for bridging the said terminals, and a movable lid or cover for holding the strip in contact with the springs, substantially as set forth.

3. The combination, with a box or case and spring terminal plates or strips therein, of a fusible safety-strip for bridging the terminals, a movable lid or cover for holding the strips in contact with the springs, and a catch for securing the cover, all substantially as set forth.

4. The combination, with the connection-box B and spring-terminals E F, of the hinged or movable lid N and the safety-strip secured thereon in position to bridge the terminals E F when the lid is closed.

In testimony whereof I have hereunto set my hand this 1st day of October, 1883.

EDWARD WESTON.

Witnesses:
HENRY A. BECKMEYER,
R. W. BLOEMEKE.